March 8, 1927. 1,620,115
F. J. MacKENZIE
HYDRAULIC BRAKE MECHANISM
Filed Dec. 6, 1924     2 Sheets-Sheet 1
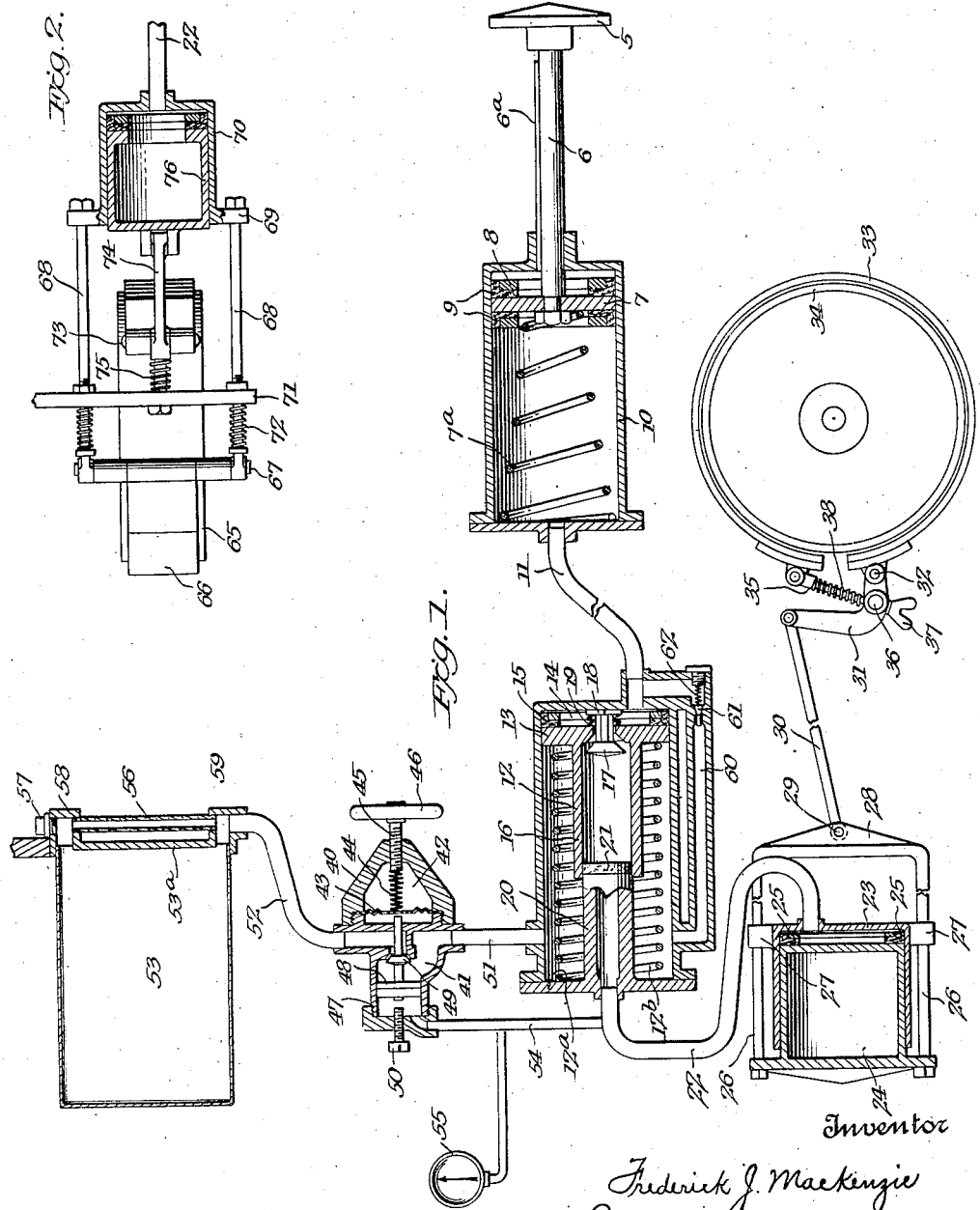

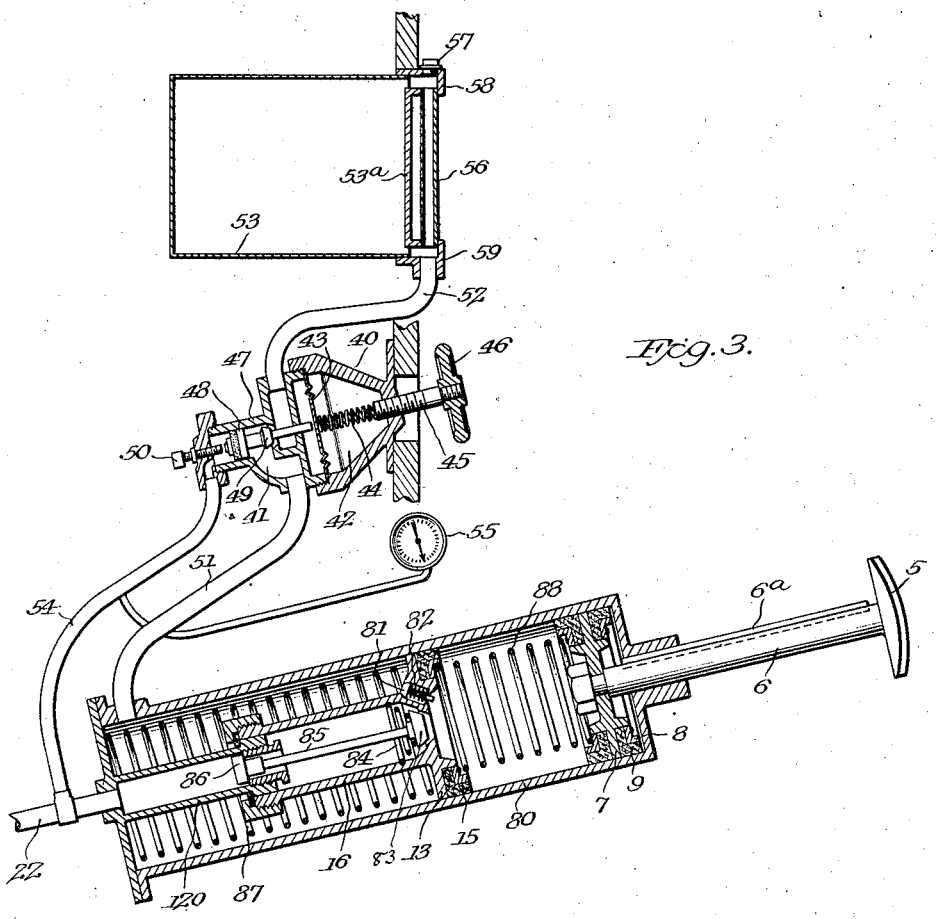

Patented Mar. 8, 1927.

1,620,115

UNITED STATES PATENT OFFICE.

FREDERICK J. MACKENZIE, OF TRENTON, NEW JERSEY.

HYDRAULIC BRAKE MECHANISM.

Application filed December 6, 1924. Serial No. 754,330.

My invention relates to fluid operated brakes, and more particularly to brakes using a liquid, such as oil, and the object of the invention is to provide a mechanism that will require but very little pressure and in which any pressure initially applied will transmit to the brake or brakes sufficient pressure to actuate the brake band without causing the wheel to skid, and to provide means to adjust the pressure from the dash board of the vehicle.

Most of the pedal movement in the brakes customarily used is used in taking up the slack, and the brake bands require constant adjustment so as not to have an excess of slack.

On account of the fixed leverage it is practically impossible to have the proper tension on the brake bands. A brake designed to be operated by a strong man to apply the proper tension would be useless if operated by a young girl, as the applied tension is the operator's strength multiplied by the leverage.

These faults I have overcome by constructing a brake mechanism of the hydraulic type that has a varying piston or plunger displacement. I use two pistons, which while operated by the pedal act independently of one another; the larger piston taking up the slack in the bands and the smaller piston applying the braking pressure, only after the slack has been taken up, no matter how much or how little this slack may be.

The amount of energy that can be exerted by a weak operator is sufficient to skid the wheels, but is prevented from doing so by a control mechanism, so that the pressure applied to the brake actuating devices will be practically independent of the variations of pressure exerted by any operator.

I also provide means for changing the braking pressure by the operator according to the condition of the road, and to conform to the load while the car is being operated.

Referring to the drawings in which like parts are similarly designated—

Figure 1 is a sectional view illustrating my invention.

Fig. 2 is a section showing a modified arrangement of brake band and operating cylinder, and Fig. 3 illustrates a modified arrangement showing the two actuating pressure cylinders constructed as a unit.

Referring to Fig. 1, 5 is a foot pedal within reach of the operator's foot as is customary. The stem 6 of this pedal has a feather 6ª to prevent it from rotating and is connected to an impulse piston comprising a piston member 7, ring washers 8 bolted thereto and holding in place leather or equivalent packing rings 9. This impulse piston moves in an impulse cylinder 10 against the action of a retracting spring 7ª.

The cylinder is connected by a pipe connection 11, or otherwise to a distributing cylinder 12 that distributes pressure to the individual brake devices.

Within the distributing cylinder is a piston 13 provided with a metal ring washer 14 holding in place a leather or other flexible packing 15. The piston 13 has a cylinder 16 of considerably less diameter than the piston and a central opening through the piston controlled by a check valve 17 whose stem passes through said opening and is provided with a nut or equivalent stop 18 that confines a coil spring 19 surrounding the valve stem. This spring is placed between the piston and the nut and urges the valve to its closed position.

The cylinder member 16 cooperates with a stationary hollow piston member 20 on the removable head 12ª of the cylinder 12. The free end of this piston member 20 is provided with a packing ring 21. The interior of the piston member 20 is connected by a distributing pipe 22 to an operating cylinder 23 containing a plunger 24 having a flexible packing 25.

Connected to the plunger 24 are rods 26 guided in eyes 27 on the cylinder 23 and connected to a cross head 28 to which is pivoted at 29 the brake actuating rod 30. The opposite end of the rod 30 is connected to the end of a bent lever 31, the other end of which is connected at 32 to one end of the brake band 33 on the brake drum 34. The other end of the brake band 33 is connected to a bolt 35 passing loosely through an eye 36 on the bent lever 31 and has a thumb nut 37 for adjusting the space between the two ends of the brake band. A spring 38 surrounds the bolt 35 to release the brake when the braking pull is released.

I have shown but a single brake 33, its actuating cylinder 23 and plunger 24 connected to the hollow piston 20, but it is to be understood that two such are usually so connected with the usually constructed vehicles, and that four will be used on four wheel braked vehicles. Any number of brakes may be operated from such a piston member 20.

Connected to the distributing cylinder 12 is a regulating device for regulating the pressure that is to be distributed by the cylinder 12, and comprising a casing 40 having two chambers 41 and 42. The chamber 42 is closed by a flexible diaphragm 43 against which is supported one end of a coil spring 44 the other end being supported by the end of an adjusting screw 45 having a handwheel or equivalent handle 46. A portion of the casing 40 is formed as a cylinder 47 and contains a piston 48 that carries a valve 49 whose stem projects against the diaphragm. An adjusting screw 50 regulates the throw of the piston 48 in one direction.

The chamber 41 is connected by a pipe 51 to cylinder 12 and the valve 49 controls the flow at one side of piston 48 of liquid through 51, chamber 41 and pipe 52 to reservoir 53. The cylinder 47 is connected on the opposite side of the piston 48 with the liquid operating the brakes, and is here shown as connected by a pipe 54 to the tube 22, or it may be to the hollow piston member 20 if so desired.

A pressure gauge 55, located on the dash board of the vehicle and indicating the pressure of the operating liquid may or may not be used, as desired. This gauge is conveniently connected to pipe 54.

The reservoir 53 is provided with a sight tube 56 indicating the level of liquid therein, and a filling opening closed by a screw plug 57. This reservoir is preferably of sheet metal having a head 53$^a$ provided with two hollow projections 58 and 59 between which the sight tube is connected, and the upper one 58 is provided with a filling opening. This head 53$^a$ may be also mounted in the dash board.

The pressure distributing cylinder 12 is provided with a by-pass 60 controlled by a check valve 61 urged to its closed position by a light spring 62. This passage 60 connects the front and rear ends of the cylinder 12 and permits liquid to flow back to cylinder 10 should such liquid be forced past the piston 13 or to compensate for leakage. The valve 61 closes against the pressure in the pressure cylinder 10, but may open upon the return stroke of piston 7 due to the suction produced by this piston when retracted by spring 7$^a$.

The amount of movement required to set the brakes is small, as but about one-sixteenth of an inch is the clearance or slack between the band and brake drum, and if the ratio of movement of the brake pedal to that of the band be chosen about sixteen to one, then a movement of about one inch, for four wheel brakes or one-half inch for two wheel brakes, of the brake pedal will be sufficient to take up all slack of the operating parts, and the movement of the pedal for an additional inch should apply the brakes.

The operation is as follows:

When pressure is applied to pedal 5 to set the brakes, piston 7 is moved against the stress of spring 7$^a$, and oil, which is the liquid preferably used, is forced from cylinder 10 through pipe 11 into the end of cylinder 12. The pressure on piston 13 is first resisted by spring 12$^b$, holding piston 13 in normal position. The valve 17 being open, the oil will be forced through valve 17, cylinder 16, hollow piston 20 and pipe 22 into cylinder 23, and take up all the slack.

As soon as all slack is taken up, a higher pressure is exerted on the oil in cylinder 10 and against piston 13. This will cause spring 12$^b$ to compress and piston 13 to move carrying the valve 17 away from the head of cylinder 12, allowing the spring 19 to close the valve 17, thus separating the oil in cylinder 16 from the oil in cylinder 10 and on the head of piston 13. This permits the strain that is exerted on pedal 5 and thence to the head of the piston 13, to be exerted on the small cylinder 16, producing a high pressure in the hollow piston 20 and the cylinder 23, causing the proper tension on the brakes.

The oil behind the piston 13 in cylinder 12 is displaced through pipe 51 to chamber 41 of a casing 40, past a valve 49 and through a pipe 52 into the reservoir 53. The rate of movement or speed of the piston 13 is dependent upon the degree of throttling effected by the valve 49.

The oil within the cylinder 16 effects the braking pressure after valve 17 is closed, and piston 13 forces oil through the hollow piston member 20, pipe 22 to the operating cylinder or cylinders 23 operating the plunger or plungers 24 to exert a pull on the rods 26, a cross-head 28 and a brake rod 30 to actuate the bent lever 31 and draw the ends of the brake band together.

The oil pressure through the distributing pipe 22 is prevented from being too great by checking the movement of piston 13, and this I do by causing oil from the hollow piston 20 to pass by a pipe 54 behind piston 48 and close valve 49 to prevent the escape of oil from cylinder 12 and hold the piston 13 therein against movement. It will, therefore, be immaterial how great the pressure is on pedal 5, or how long such pressure is exerted, as such pressure cannot be transmitted to the brake operating cylinders.

The pressure transmitted to the brake operating cylinders can be adjusted to suit the conditions of the load and of the road, by adjusting the diaphragm 43 to increase or decrease the resistance to closing of the valve.

This is done by increasing or decreasing the tension of spring 44 acting on the diaphragm, by the hand screw 45.

Now, suppose the square inch pressure in cylinder 23 and against piston 24 to effect the taking up of slack is eight pounds per sq. in., and the tension of the spring holding piston 13 to normal position would hold against a pressure of 10 lbs. per sq. in., and also suppose that in order to take up slack it would require 5 cu. in. of oil to be displaced from the pedal cylinder 10 through the pipes to the brake-actuating cylinder 23.

The faster the flow through the pipes the greater the drop in pressure from one end of the pipe to the other in the direction of flow.

Now assume that under normal braking the time required for displacing the five cubic inches of oil would be one second and the drop in pressure would be one-half pound per square inch. The pressure in cylinder 10 would then be eight and one-half pounds, one and one-half pounds less than would be required to move piston 13 against its spring. Then the slack would be taken up before the pressure got high enough to move piston 13, and the timing would be normal.

But, in an emergency, assume that the pedal was thrust down in one-eighth of a second, then the drop in pressure would be about eight times one-half pound, or four pounds. This would build up a pressure in cylinder 12 and against piston 13 of twelve pounds, two lbs. more than could be held by the spring, and piston 13 would move this piston allowing valve 17 to close before the slack was taken up, thus changing the operation, so that the slack would have to be taken up by the displacement of oil from hollow piston 16, which is a small cylinder requiring large pedal movement. Now then, by causing a throttling action between the chamber, behind piston 13, and the reservoir, as by throttle valve 49, there would be a drop in pressure between the chamber and the reservoir 53, the higher pressure being in the chamber. Therefore, under a sudden thrust a pressure will be built up in the oil of the chamber behind piston 13, in order to resist its displacement. The smaller the throttled outlet, the higher will be this pressure. This pressure acts to aid the spring 12$^b$, and the piston 13 will remain at normal until the slack is taken up for the correct sequence of operation.

When pressure on pedal 5 is released, spring 7$^a$ returns the piston 7 and pedal 5 to normal position. The suction withdraws oil from the front of piston 13 into cylinder 10 and allows said piston 13 to follow under the action of spring 12$^b$. The movement of piston 13 toward the right relieves the pressure in cylinder 16 and allows the parts to assume normal position, and oil will flow from reservoir 53 past valve 49, pipe 51 into cylinder 12 behind the piston 13. To compensate for any leakage, oil from cylinder 12 passes through conduit 60, valve 61 and pipe 11 into cylinder 10. As soon as piston 13 reaches about the end of its stroke, the stem of valve 17 strikes the end wall of cylinder 12 and the valve opens, equalizing the pressure throughout the system.

The pressure gauge 55 indicates the braking pressure applied to the brakes, as well as the change of pressure produced by the actuation of the hand wheel 46, so that the operator may know what pressure is sufficient to effectually brake without skidding.

In Fig. 2 I have shown a modified construction of brake actuating devices, in which 65 is the brake drum and 66 the brake band, one end of which is connected to a rod 67. The rod 67 is supported on the ends of two rods 68 whose opposite ends are secured in ears 69 on the brake actuating cylinder 70 connected to the flexible pipe 22 supplying oil thereto. The rods 68 pass through a supporting member or bar 71 fixed to a stationary part of the vehicle, and coil springs 72 surround the rods 68 between the rod 67 and bar 71. The opposite end of the brake band 66 is connected to a rod 73 that passes through a plunger rod 74. One end of the plunger rod is slidably mounted in bar 71 and carries a spring 75 on its reduced end that passes through bar 71. The other end of the plunger rod is pivoted to the plunger 76 having an opening direct to pipe 22 so that pressure may be applied within the plunger. When pressure is applied to the oil in cylinder 70 the plunger 76 and cylinder 70 move in opposite directions and tighten the brake band, and when the pressure is released the springs 72 and 75 return the parts to normal position and release the brake band.

It is not necessary that the pistons 7 and 13 be in separate cylinders, and in the modified construction illustrated in Fig. 3 I have shown these two pistons in a single cylinder. The piston 13 in this instance carries the by-pass valve 81 loaded by a light spring 82, and this valve opens under the head of oil in the reservoir 53.

The cylinder 16 has a valve 83 urged to closed position by a spring 84, and its stem 85 passes entirely through the cylinder and carries at its other end a nut 86. This nut does not close the end of the hollow piston 120. A spring 87 urges the piston 13 to normal position, and a spring 88 is included between the two pistons 13 and 7 and has the same function as spring 7$^a$, Fig. 1.

The other parts and connections are the same as in Figure 1.

When pressure is applied to the pedal 5, piston 7 exerts pressure on the oil between the pistons 7 and 13; and piston 13 and its valves move as a unit, forcing the oil in 120 to the brake operating cylinder through the distributing tube 22 to take up the slack. Then as the pressure on the pedal increases sufficiently to operate valves 83 and 86 against the pressure of their spring 84, oil passes from between the pistons 7 and 13 through cylinder 16 and hollow piston 120 to the distributing tube 22, and at the same time the greater pressure on the larger area of piston 13 causes this piston to move down until a given pressure is reached, when the piston 13 is prevented from further movement by the throttle valve 49, as explained with reference to Figure 1. The adjustment and regulation of the pressure are accomplished by the same devices as in the construction illustrated in Figure 1.

I claim:

1. In a hydraulic brake construction, brake actuating mechanism, hydraulic pressure supplying means and hydraulic distributing means including mechanism to send liquid to the brake actuating mechanism to take up slack thereof and cut off and entrap said liquid, and means also included in said hydraulic distributing means to thereafter cause remaining liquid to bodily move the volume of entrapped liquid that has taken up the slack, to complete the operation of the brake actuating mechanism.

2. In a hydraulic brake mechanism, a brake actuating device, hydraulic pressure distributing means connected to said device, a hydraulic piston to operate said means to cause the brake actuating device to take up slack of the brake and an element carried by a moving part of the hydraulic distributing means to permit the pressure of said piston to be applied directly to said device, and a reservoir connected to the discharge of said means.

3. In a hydraulic brake mechanism, a brake actuating device, a hydraulic distributing cylinder connected to said device, a distributing piston in said cylinder having a plunger cylinder thereon, a stationary hollow piston in said distributing cylinder and co-operating with said plunger cylinder a valve in said distributing piston connecting the distributing cylinder and plunger cylinder, manually operated means to exert pressure on liquid in one end of the distributing cylinder and a reservoir connected to the opposite end of said cylinder.

4. In a hydraulic brake mechanism, a brake actuating device, a hydraulic distributing cylinder connected to said device, a distributing piston in said cylinder having a plunger cylinder thereon, a stationary hollow piston in said distributing cylinder and co-operating with said plunger cylinder, a reservoir connected to one end of said distributing cylinder and manual means to apply hydraulic pressure at the opposite end of said cylinder, means carried by the distributing piston to permit the application of hydraulic pressure from said manual means directly to said brake actuating device, and hydraulic mechanism included between said distributing cylinder and hollow piston to control and adjust the pressure applied to said brake actuating device.

5. In a hydraulic vehicle brake mechanism, a brake actuating device, a hydraulic mechanism connected to said device, manual means to exert hydraulic pressure on said mechanism to cause the brake device to take up slack, an element to permit the pressure of said manual means to be directly transmitted to said device after the slack has been taken up, a reservoir connected to said hydraulic mechanism to receive liquid from and deliver liquid to said hydraulic mechanism and hydraulic means interposed between said reservoir and hydraulic mechanism and connected with said device, to control the pressure exerted on said device by said manual means.

6. In a hydraulic vehicle brake mechanism, a brake actuating device, a hydraulic mechanism connected to said device, manual means to exert hydraulic pressure on said mechanism to cause the brake device to take up slack, an element to permit the pressure of said manual means to be directly transmitted to said device after the slack has been taken up, a reservoir connected to said hydraulic mechanism to receive liquid from and deliver liquid to said hydraulic mechanism, and hydraulic means operable during the operation of the vehicle, interposed between said reservoir and hydraulic mechanism and connected with said device, to control the pressure exerted on said device by said manual means.

7. In a hydraulic vehicle brake mechanism, the combination with a hydraulic distributing cylinder and its piston, of a plunger cylinder on said piston, a hollow plunger in said distributing cylinder co-operating with said plunger cylinder, a reservoir connected to said distributing cylinder, a casing interposed between said reservoir and distributing cylinder, a throttle valve in said casing, a piston in said casing to operate said valve, means connecting said plunger and casing at one side of said piston, and manually adjusted means to yieldingly oppose the closing movement of said valve and its operating piston.

8. In a hydraulic vehicle brake, a distributing cylinder having two liquid chambers therein, a piston displaceable in said cylinder, a brake device operatively connected to one of said chambers, a liquid reservoir, a connection between said reservoir and the other chamber, a normally open throttle valve included in said connection, and hydraulic means connected to the first chamber to actuate said valve to restrict the flow to said reservoir in accordance with the braking pressure in said first chamber and thereby retard the operation of said piston.

9. In a hydraulic vehicle brake, a distributing cylinder having two chambers, a piston displaceable in said cylinder, a brake device operatively connected to one of said chambers, a reservoir, a connection between said reservoir and the other chamber, a normally open throttle valve included in said connection and means hydraulically connected with the first chamber to actuate said valve to control the passage of liquid between the reservoir and said other chamber and an adjustable resistance retarding the closing of said valve.

10. In a hydraulic vehicle brake, a distributing cylinder having an inner and an outer chamber, a piston displaceable in said cylinder to simultaneously change the volume of both chambers, hydraulic brake mechanism connected with said inner chamber, a reservoir, a connection between said reservoir and outer chamber, a casing in said connection, a throttle valve therein controlling the movement of liquid to the reservoir from said outer chamber, a diaphragm in said casing at one end of said valve, and a hydraulic piston at the other end of said valve operated by liquid from said inner chamber.

11. In a hydraulic vehicle brake, a distributing cylinder having an inner and an outer chamber, a piston displaceable in said cylinder to simultaneously change the volume of both chambers, hydraulic brake mechanism connected with said inner chamber, a reservoir, a connection between said reservoir and outer chamber, a casing in said connection, a throttle valve therein controlling the movement of liquid to the reservoir from said outer chamber, a diaphragm in said casing at one end of said valve, and a hydraulic piston at the other end of said valve operated by liquid from said inner chamber, a set screw to adjust the movement of the piston and valve in one direction and yielding manual adjusting means to vary the resistance of said diaphragm.

12. In a hydraulic vehicle brake mechanism, a main cylinder, an impulse piston in one end thereof, a pedal for operating said piston, a distributing piston also in said cylinder and spaced from the first piston, a distributing cylinder carried by said distributing piston, a hollow stationary piston co-operating with said distributing cylinder, a valve controlling the entrance of liquid to said distributing cylinder from the space between the two pistons, a valve controlling the entrance of liquid into said stationary piston and connected to the first valve for simultaneous movement, a spring to return the distributing piston to normal position, a reservoir connected to the main cylinder at its discharge end, a throttle valve between said reservoir and main cylinder and manual means to vary the operation of said valve during the operation of the vehicle.

13. In a hydraulic vehicle brake mechanism, a main cylinder, a reservoir, a connection between said cylinder and reservoir, a throttle valve in said connection, manual means to regulate the operation of said valve during the operation of the vehicle, a piston to operate said valve, a pedal operated impulse piston in said main cylinder, a distributing piston also in said main cylinder and spaced from said impulse piston, a distributing cylinder connected to the impulse piston, a stationary hollow piston co-operating with said impulse cylinder, a normally open spring held valve in said distributing piston controlling the passage of fluid to said distributing cylinder, a valve for said hollow piston, the latter two valves connected for simultaneous operation, means to transmit fluid pressure from said stationary piston behind said throttle valve piston and a distributing tube connected to said stationary piston.

14. In a hydraulic vehicle brake, a hydraulic distributing mechanism, a hydraulic brake operating device connected thereto, means to permit liquid to be sent through said distributing mechanism directly to said brake operating device to take up the slack in the brakes, means included in said distributing mechanism to then shift the action of the operating fluid to said distributing mechanism to complete the setting of the brakes, a liquid reservoir, a connection between the reservoir and distributing mechanism to provide liquid to retard the operation thereof, and a normally open throttle valve in said connection operated by liquid pressure at the brake operating device.

15. In a brake construction, means to operate a brake, pedal operated mechanism for distributing operating pressure to such means to take up slack at the brake, appliances automatically brought into operation by said means after the taking up of the slack to operate said means to effectively apply the brake with a greater pressure continuously under control of the pedal pressure, and means to automatically dampen the operation of said appliances to limit and control the brake operating pressure that may be applied to prevent so strong an application of the brake that a vehicle to which it is applied will skid.

16. In a brake construction, hydraulic means to operate a brake, pedal operated mechanism for distributing operating pressure to such means to take up slack at the brake, hydraulically operated appliances automatically brought into operation after the taking up of the slack to operate said means by pedal pressure applied thereto to effectively apply the brake with a greater pressure, and hydraulic by-pass means to automatically dampen the operation of said appliances to limit and control the brake operating pressure that may be applied to prevent so strong an application of the brake that a vehicle to which it is applied will skid, and regulating means to regulate the degree of damping, and thereby increase or decrease the braking pressure.

In testimony that I claim the foregoing as my invention, I have signed my name hereto.

FREDERICK J. MacKENZIE.